United States Patent

Brendel et al.

[11] 4,010,833
[45] Mar. 8, 1977

[54] CLUTCH ASSEMBLY FOR PLANETARY-GEAR TRAINS

[75] Inventors: Uwe Brendel, Kressbronn; Manfred Bucksch, Friedrichshafen, both of Germany

[73] Assignee: Zahnradfabrik Friedrichshafen AG, Friedrichshafen, Germany

[22] Filed: Feb. 19, 1975

[21] Appl. No.: 551,053

[52] U.S. Cl. .................... 192/87.11; 192/87.15
[51] Int. Cl.² ........................... F16D 25/10
[58] Field of Search .......... 192/87.11, 87.15, 12 C, 192/18.1, 87.1

[56] References Cited

UNITED STATES PATENTS

| | | | |
|---|---|---|---|
| 3,710,650 | 1/1973 | Piret | 192/87.11 |
| 3,744,606 | 7/1973 | Bucksch | 192/87.11 |
| 3,844,393 | 10/1974 | Zaiser | 192/87.11;87.15 |

*Primary Examiner*—Benjamin W. Wyche
*Attorney, Agent, or Firm*—Karl F. Ross; Herbert Dubno

[57] ABSTRACT

A pair of hydraulic clutches, serving to connect an input shaft with either of two nested output shafts coaxial therewith, comprise a common die-cast annular carrier in the form of a generally cylindrical sleeve whose inner and outer surfaces are integrally formed with peripherally spaced first and second ribs for the guidance of a first and a second set of annular friction foils, respectively. The carrier has an inner radial flange forming an abutment for one of the friction foils of the first set, the second ribs being axially offset from the first ribs and extending beyond that flange in the form of peripherally separated prongs. The inner sleeve surface diverges outwardly from the region of the flange, with a slight draft as needed for casting; at its wider end the sleeve is fastened to a similarly produced first clutch housing accommodating a first piston normally held spaced apart from the first friction foils by a Belleville spring inserted between the sleeve and that clutch housing. A second clutch housing envelops the part of the sleeve carrying the second friction foils and accommodates a second piston coacting with the latter foils. The flange has gaps open toward the spaces between the second ribs to facilitate the circulation of fluid along the sleeve from a supply channel within the inner output shaft to an outlet port of a surrounding transmission housing.

8 Claims, 2 Drawing Figures

CLUTCH ASSEMBLY FOR PLANETARY-GEAR TRAINS

CROSS-REFERENCE TO RELATED APPLICATIONS

This application relates to subject matter disclosed in commonly owned applications Ser. No. 535,701 now U.S. Pat. No. 3,970,176 and Ser. No. 535,702 now U.S. Pat. No. 3,964,584 filed Dec. 23, 1974 by one of us, Manfred Bucksch.

FIELD OF THE INVENTION

Our present invention relates to a clutch assembly for selectively coupling an input shaft with either of two nested output shafts coaxial therewith, e.g. as used in planetary-gear trains forming part of an automotive transmission.

BACKGROUND OF THE INVENTION

In the above-identified commonly owned applications there has been disclosed an automatic speed-changing system of this type wherein two clutches and a brake are accommodated in a common transmission housing, the first clutch including a clutch housing positively connected with an extremity of an input shaft whereas the second clutch comprises a clutch housing positively connected with an extremity of the outer one of the two nested output shafts. The two clutches further include respective sets of annular friction foils both carried on an extension of the first clutch housing; as shown but not claimed in these earlier applications, that extension has the shape of a generally cylindrical sleeve whose inner peripheral surface is formed with ribs for the guidance of alternate friction foils of the first clutch while its outer peripheral surface has ribs guiding alternate foils of the second clutch. These sleeve-supported foils respectively coact with interleaved foils guided on a collar splined to a projecting extremity of the inner output shaft in the case of the first clutch and on the second clutch housing in the case of the second clutch.

OBJECTS OF THE INVENTION

The general object of our present invention is to provide a clutch assembly of the aforedescribed character whose principal parts, including the clutch housings and the interposed common foil carrier, have a simple structure enabling their manufacture by casting with little or no machining.

A more particular object is to provide an assembly of this type wherein a lubricating and/or cooling fluid can freely circulate between a supply channel in one of the coaxial shafts and an outlet port in the transmission housing.

SUMMARY OF THE INVENTION

An important feature of our present invention resides in the provision of the aforementioned generally cylindrical sleeve carrying two sets of friction foils on its inner and outer peripheral wall surfaces. Advantageously, that sleeve and the first clutch housing are interconnected with the aid of slidingly interfitted peripheral formations. Thus, the clutch housing and the sleeve can be conveniently formed by die casting, it being merely necessary for this purpose to provide them with the necessary draft to facilitate their extraction from the respective molds. In particular, the inner sleeve surface should diverge slighty toward the first clutch housing to which the sleeve is to be secured.

According to another feature of our invention, the sleeve is integrally cast with an inner radial flange forming an abutment for one of the friction foils carried thereon, i.e. for the last foil of the first set; advantageously, the flange extends radially inwardly beyond the abutting foil in order to backstop it effectively against the force of the associated piston.

In a preferred construction, the outer ribs of the sleeve extend axially across the flange and terminate in peripherally spaced-apart prongs overhanging same on the side remote from the first clutch housing, thereby forming spaces through which lubricating and cooling oil may freely circulate from the center outwardly (or possibly in the opposite direction). That circulation is further facilitated by providing the flange with beveled gaps open toward the spaces between these outer ribs, the fluid then flowing toward the outlet port of the transmission housing along a path lying between the sleeve and the foils of the second clutch which are axially offset from those of the first clutch in the direction away from the first clutch housing.

The pistons coacting with the sleeve-supported foils are normally held away from these foils by suitable biasing means such as Belleville springs. The Belleville spring for the first clutch is advantageously interposed between the corresponding piston and the sleeve, the piston having a clutch-actuating projection surrounded by that Belleville spring.

BRIEF DESCRIPTION OF THE DRAWING

The above and other features of our invention will now be described in greater detail with reference to the accompanying drawing in which.

SPECIFIC DESCRIPTION

Figure 1:
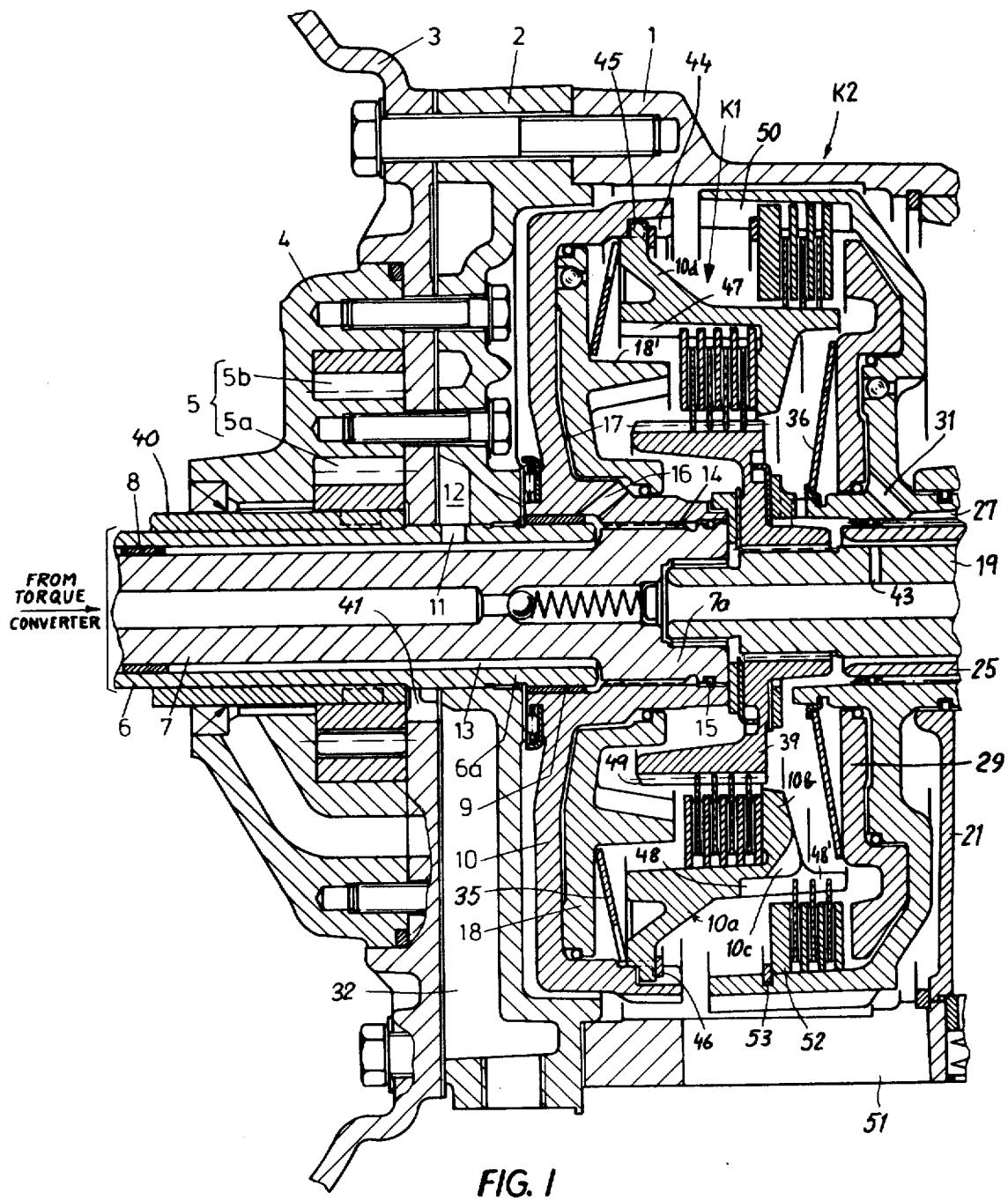
FIG. 1 is an axial sectional view of the left-hand portion of a speed-changing system embodying our invention, including two hydraulic clutches and a hydraulic brake.
Figure 2:
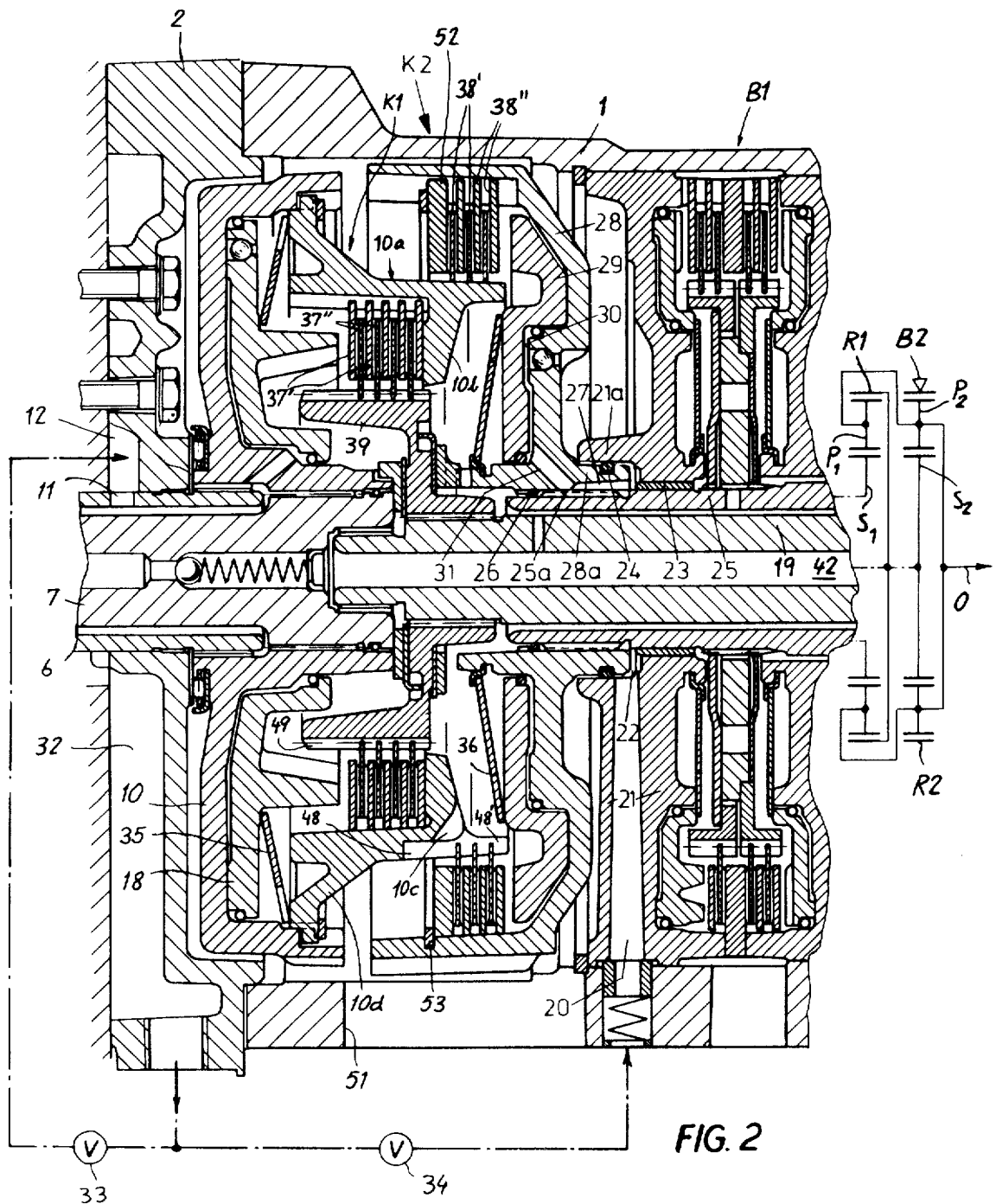
FIG. 2 is a view similar to FIG. 1, partly overlapping same and showing the right-hand portion of the system.

The system shown in the drawing comprises a transmission housing 1 enclosing the extremities of three coaxial shafts, namely an input shaft 7 and two nested output shafts 19, 25. Input shaft 7 is driven in the conventional way, e.g. as illustrated in commonly owned U.S. Pat. No. 3,593,599, from an internal-combustion engine via a hydraulic torque converter not further illustrated. Output shafts 19 and 25 serve as inputs for two cascaded planetary-gear trains here shown, by way of example, as being of the type disclosed in the same commonly owned patent, with sun gears $S_1$, $S_2$, planet gears $P_1$, $P_2$ and ring gears $R_1$, $R_2$, serving to drive a load shaft 0 with a variable speed ratio as is well known per se. Sun gears $S_1$ and $S_2$ are keyed to outer output shaft 25 and inner output shaft 19, respectively, and can thus be driven independently or jointly under the control of hydraulic clutches K1 and K2 within transmission housing 1. This transmission housing also contains a conventional hydraulic brake B1, actuatable to arrest the outer shaft 25, and another such brake B2 illustrated only schematically and serving to immobilize the ring gear $R_2$. The planetary-gear system also includes one-way couplings which have not been illustrated.

The clutches K1 and K2 are respectively provided with a first annular clutch housing 10, containing an axially slidable annular piston 18, and a second annular clutch housing 28, containing an axially slidable annular piston 29. Pistons 18 and 29 are normally held in a retracted position by respective Belleville springs 35, 36; when displaced by high-pressure fluid, as more fully described below, piston 18 engages a set of interleaved friction foils 37', 37'' by an annular projection 18' whereas piston 29 engages a similar set of foils 38, 38''; Belleville spring 35 is traversed by projection 18'. Annular foils 37 are alternately mounted on the inner periphery of an extension 10a of first clutch housing 10 and on a collar 39 which is splined to the left-hand end of shaft 19, projecting beyond shaft 25, and effectively forms an extension thereof; annular foils 38' and 38'' are alternately mounted on the outer periphery of the same clutch-housihg extension 10a and on the inner periphery of the second clutch housing 28, respectively. The first clutch housing 10 is splined at 14 to the right-hand end of input shaft 7; the second clutch housing 28 is similarly splined, at 25a, to the left-hand end of shaft 25.

Shaft 7 is rotatably journaled in a mounting tube 6 coaxially surrounding same with formation of an annular clearance 13 therebetween, this clearance extending around the end of the tube 6 between the latter and an enlarged head 7a of shaft 7 carrying the clutch housing 10. Clearance 13 is bounded by two sealing rings 8 and 9 of low-friction material, ring 8 being press-fitted into tube 6 as a journal bearing for shaft 7 whereas ring 9 is press-fitted into a central bore of clutch housing 10 to serve as a counterbearing for that clutch housing and therefore also for the supporting extremity of shaft 7. Tube 6 and 7 are respectively secured to the stator and the rotor of the preceding torque converter whose housing has been partly illustrated at 3, being bolted to transmission housing 1 through an end plate 2 of the latter; tube 6 may therefore be regarded as stationary, with reference to housing structure 1 —3, even though this is not essential.

A tubular shaft 40, rotatably carried by tube 6, forms the input for a gear pump 5 whose housing 4 is bolted to plate 2, this gear pump having relatively eccentric toothed rings 5a and 5b meshing with each other in the lower part of housing 4. Oil delivered by pump 5 enters at 41 into a high-pressure port 32 from which it is distributed to other parts of the system, in particular to a first passage 12 and to a second passage 20 leading to the interior of clutch housings 10 and 28, respectively. The admission of oil to these passages is automatically controlled, e.g. in the manner described in the aforementioned U.S. Pat. No. 3,593,599, through valves indicated diagrammatically at 33 and 34.

The first passage 12 extends through a radial bore 11 in tube 6 into clearance 13 and thence via an oblique bore 16 of clutch housing 10 into the interior 17 thereof, to the left of its piston 18. Second passage 20, extending radially within a partition 21, terminates inside an annular boss 21a of this partition in a ring channel 22 which is defined by confronting faces of partition 21 and of a hub 28a of clutch housing 28 surrounded by boss 21a. The passage further extends into the interior 30 of clutch housing 28 through a slanting bore 31 thereof communicating with a groove 27 on the inner periphery of hub 28a, the bore 31 lying to the right of piston 29. A sealing ring 24 in an annular groove of hub 28a prevents the escape of oil from ring space 22. Partition 21 divides the interior of transmission housing 1 into a left-hand compartment, accommodating the clutches K1 and K2, and a right-hand compartment, accommodating the brake B1.

Partition 21 is formed with a central bore into which a bearing ring 23, similar to rings 8 and 9, is press-fitted to serve as a journal for the left-hand end of outer output shaft 25; ring 23 also prevents leakage from ring channel 22 to another channel system, including a central bore 42 of shaft 19 and a transverse bore 43 from which cooling and lubricating oil is discharged into clutch housing 28. In order to guard against oil leakage in the opposite direction, i.e. by way of splines 25a, a sealing ring 26 is interposed between shaft 25 and clutch housing 28 to the left of this spline coupling. Similarly, a sealing ring 15 prevents the outflow of oil via spline coupling 14 from clearance 13. These sealing rings could be omitted, of course, if the corresponding spline couplings were replaced by solid welding connections or the like.

Housing extension 10a is a nearly cylindrical sleeve, centered on the common shaft axis, cast separately from clutch housing 10 and fitted thereto for joint rotation with the aid of complementary peripheral teeth 44 on an inner rim surface of the housing and 45 on an outer rim surface of the sleeve, any separation of the two parts being prevented by a snap ring 46 acting as a retaining means. The inner sleeve surface has peripherally spaced ribs 47 for the guidance of foils 37'; foils 38' slide along similar ribs 48 which are peripherally spaced along the outer sleeve surface. Ribs 49 on collar 39 and ribs 50 on the inner periphery of clutch housing 28 serve for the guidance of coacting foils 37'' and 38'', respectively.

Sleeve 10a is integrally cast with an abutment in the shape of an inner annular flange 10b forming a backstop for the rightmost foil 37' and confronting the piston projection 18'. This flange closely approaches the collar 39 so as to leave just a narrow passage for the entry of cooling and lubricating oil from bore 43 into the space bounded by sleeve 10a and piston 18. The larger part of this oil flows freely over the right-hand surface of flange 10b, toward an outlet port 51 of transmission housing 1 leading to a nonillustrated sump, by virtue of the fact that the ribs 48 have prong-shaped rightward extensions 48' between which the coolant can circulate. Furthermore, flange 10b has gaps 10c (only one shown) with beveled bottoms which, without appreciably weakening the structure of sleeve 10a, enlarge the flow path of the oil by opening into the spaces between adjoining ribs 48 on the left-hand side of foils 38', 38'', the oil thus flowing toward port 51 past an annular abutment 52 which backstops these foils against the pressure of piston 29 and is held in position by a snap ring 53 engaging the clutch housing 28. Ribs 48 and their extensions 48' lie across the flange 10b to provide the necessary clearances while reducing to a minimum the separation of clutch housings 10 and 28.

It will be noted that the inner surface of sleeve 10a, carrying the ribs 47, diverges slightly toward clutch housing 10, the same divergence being observable on the outer sleeve surface; the left-hand end of the sleeve is formed with a more sharply diverging outer skirt 10d carrying the teeth 45. With this configuration the sleeve including its ribs 47 and 48 can be readily formed by die casting, the same as clutch housings 10 and 28.

We claim:

1. A clutch assembly for selectively coupling an input shaft with either of two nested output shafts coaxial therewith, comprising:

a first clutch housing on said input shaft open toward said output shafts and centered on the common shaft axis;

a generally cylindrical sleeve centered on said shaft axis and secured to said first clutch housing, said sleeve having an inner wall surface provided with peripherally spaced first ribs and an outer wall surface provided with peripherally spaced second ribs, said first clutch housing and said sleeve being two separate bodies provided with interfitted peripheral formations and with retaining means holding said formations in mutual engagement;

a set of first annular friction foils in said sleeve slidably guided by said first ribs, said sleeve being integrally provided with an inner radial flange forming a backstop for one of said first friction foils, said second ribs extending across said flange and terminating in peripherally spaced-apart prongs overhanging said flange on the side remote from said first clutch housing;

an annular support on an extremity of the inner one of said output shafts proximal to said input shaft;

a set of first coacting annular foils interleaved with said first friction foils and slidably mounted on said support;

a second clutch housing on the outer one of said output shafts open toward said input shaft and centered on said shaft axis, said second clutch housing partly enveloping said sleeve;

a set of second annular friction foils on said sleeve slidably guided by said second ribs;

a set of second coacting annular foils interleaved with said second friction foils and slidably mounted in said second clutch housing;

abutment means on said second clutch housing forming a backstop for said second friction foils;

a first piston in said first clutch housing fluidically movable toward said support for jointly pressing said first friction foils and coacting foils against said flange; and a second piston in said second clutch housing fluidically movable toward said support for jointly pressing said second friction foils and coacting foils against said abutment means.

2. A clutch assembly as defined in claim 1 wherein said sleeve is a casting, said inner wall surface diverging toward said first clutch housing.

3. A clutch assembly as defined in claim 1, further comprising a transmission housing surrounding said clutch housings and said sleeve, said transmission housing being provided with an outlet port for a circulating fluid, at least one of said shafts being provided with channels for the supply of said fluid to said second clutch housing between said sleeve and said second piston, said flange being provided with beveled gaps open toward the spaces between said second ribs facilitating the passage of said fluid along said sleeve to said port.

4. A clutch assembly as defined in claim 1, further comprising biasing means in said clutch housings urging said pistons away from said sleeve.

5. A clutch assembly as defined in claim 4 wherein said biasing means include a Belleville spring interposed between said first piston and said sleeve, said first piston having a clutch-actuating projection surrounded by said Belleville spring.

6. A clutch assembly as defined in claim 1 wherein said first clutch housing has a rim surrounding a rim of said sleeve, said peripheral formations being a set of inner teeth on the rim of said first clutch housing and a set of outer teeth on the rim of said sleeve.

7. A clutch assemblu for selectivity coupling an input shaft with either of two nested output shafts coaxial therewith, comprising:

a first clutch housing on said input shaft open toward said output shafts and centered on the common shaft axis;

a generally cylindrical sleeve centered on said shaft axis and secured to said first clutch housing, said sleeve having an inner wall surface provided with peripherally spaced first ribs and an outer wall surface provided with peripherally spaced second ribs;

a set of first annular friction foils in said sleeve slidably guided by said first ribs;

a first abutment on said sleeve forming a backstop for said first friction foils;

an annular support on an extremity of the inner one of said output shafts proximal to said input shaft;

a set of first coacting annular foils interleaved with said first friction foils and slidably mounted on said support;

a second clutch housing on the outer one of said output shafts open toward said input shaft and centered on said shaft axis, said second clutch housing partly enveloping said sleeve;

a set of second annular friction foils on said sleeve slidably guided by said second ribs;

a set of second coacting annular foils interleaved with said second friction foils and slidably mounted in said second clutch housing;

a second abutment on said clutch housing forming a backstop for said second friction foils;

a first piston in said first clutch housing fluidically movable toward said support for jointly pressing said first friction foils and coacting foils against said first abutment; and a second piston in said second clutch housing fluidically movable toward said support for jointly pressing said second friction foils and coacting foils against said second abutment;

said second ribs terminating in periherally spaced-apart prongs overhanging said first abutment on the side remote from said first clutch housing.

8. A clutch assembly as defined in claim 7, furtherc comprising a transmission housing surrounding said clutch housings and said sleeve, said transmission housing being provided with an outlet port for a circulating fluid, at least one of said shafts being provided with channels for the supply of said fluid to said second clutch housing between said sleeve and said second piston, said first abutment being an inner radial flange integral with said sleeve and provided with beveled gaps open toward the spaces between said second ribs facilitating the passage of said fluid along said sleeve to said port.

* * * * *